C. K. BRYCE.
PLATE CUTTING APPARATUS.
APPLICATION FILED SEPT. 11, 1917.

1,317,425.

Patented Sept. 30, 1919.
2 SHEETS—SHEET 1.

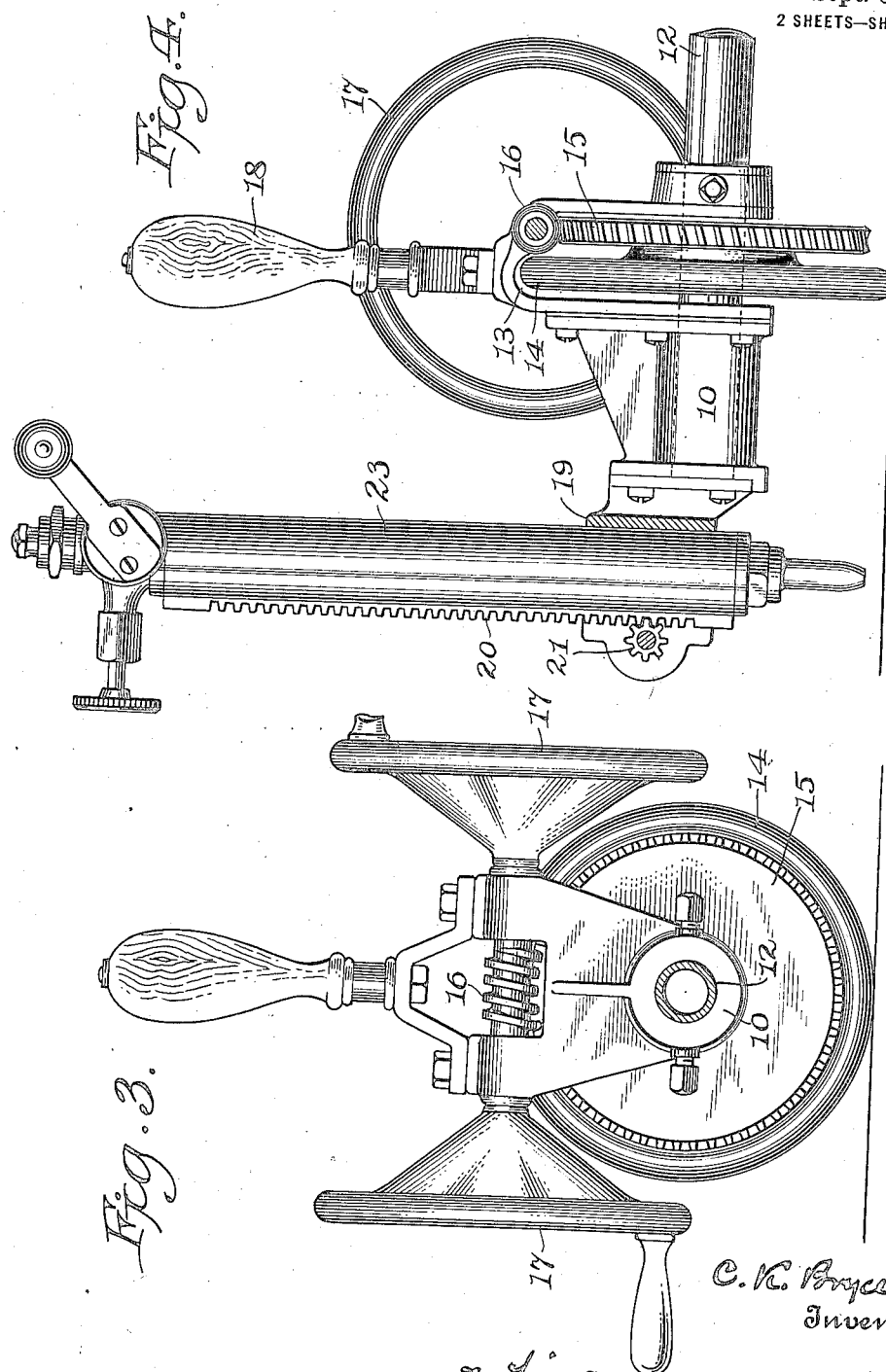

UNITED STATES PATENT OFFICE.

CHALMERS K. BRYCE, OF CRANFORD, NEW JERSEY, ASSIGNOR TO OXWELD ACETYLENE COMPANY, OF NEWARK, NEW JERSEY, A CORPORATION OF WEST VIRGINIA.

PLATE-CUTTING APPARATUS.

1,317,425.    Specification of Letters Patent.    Patented Sept. 30, 1919.

Application filed September 11, 1917. Serial No. 190,784.

*To all whom it may concern:*

Be it known that I, CHALMERS K. BRYCE, a citizen of the United States, residing at Cranford, in the county of Union and State of New Jersey, have invented certain new and useful Improvements in Plate-Cutting Apparatus, of which the following is a full, clear, and exact description.

This invention relates to apparatus for cutting metal plates and sheets by means of a blowpipe, for example an oxy-acetylene or oxyhydrogen "torch," and has for its chief object the provision of a simple device, preferably hand-actuated, by which a straight or circular cut can be easily and accurately made. To this and other ends the invention consists in the novel features and combinations hereinafter described.

One embodiment of the invention is illustrated in the annexed drawings, in which—

Fig. 3 is an end view on a larger scale, without the blowpipe.

Fig. 4 is a side view on the same scale, with one of the crank disks omitted.

Figure 1:
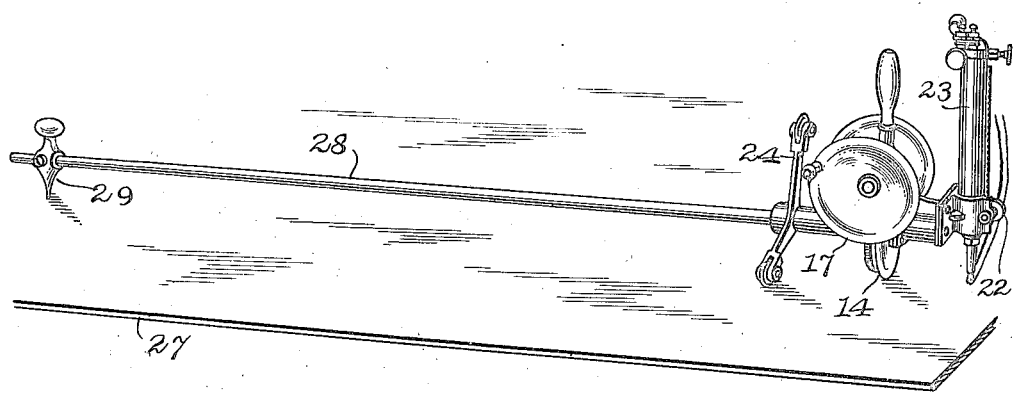
Figure 1 is a perspective view showing the apparatus in use for making a circular cut.

The blowpipe and other operative parts of the device shown are mounted on a support composed of a socket member 10 detachably secured to one end of a sleeve 12. The support has an arched recess 13 to receive the rubber tired tractor-wheel 14, rotatably mounted in the recess in any convenient manner. The tractor wheel is rotated by a worm-gear 15 rigidly connected to it and driven by a worm 16. The latter is rotated by either of two crank-disks 17 fixed on the ends of the worm shaft. A vertical handle 18 on top of the support permits the user to press the tractor-wheel firmly down upon the plate which is to be cut, so as to give the necessary tractive effect.

The blowpipe 23 is mounted in a carrier 19, fixed on the outer end of the member 10, and has a rack 20 meshing with a pinion 21 journaled in said carrier. The blowpipe can thus be adjusted vertically, by rotating the thumb-wheel 22 (Fig. 1), to position its nozzle at the proper distance from the work.

On the end of the sleeve 12 opposite to the blow-pipe is a yoke 24, having at the ends of its arms two knife-edge rollers 25 of hardened steel.

The axes of the rollers are parallel to the axis of the tractor-wheel 14. The yoke is rotatively and detachably mounted and can be fixed in any angular position by means of a set screw 26.

Figure 2:
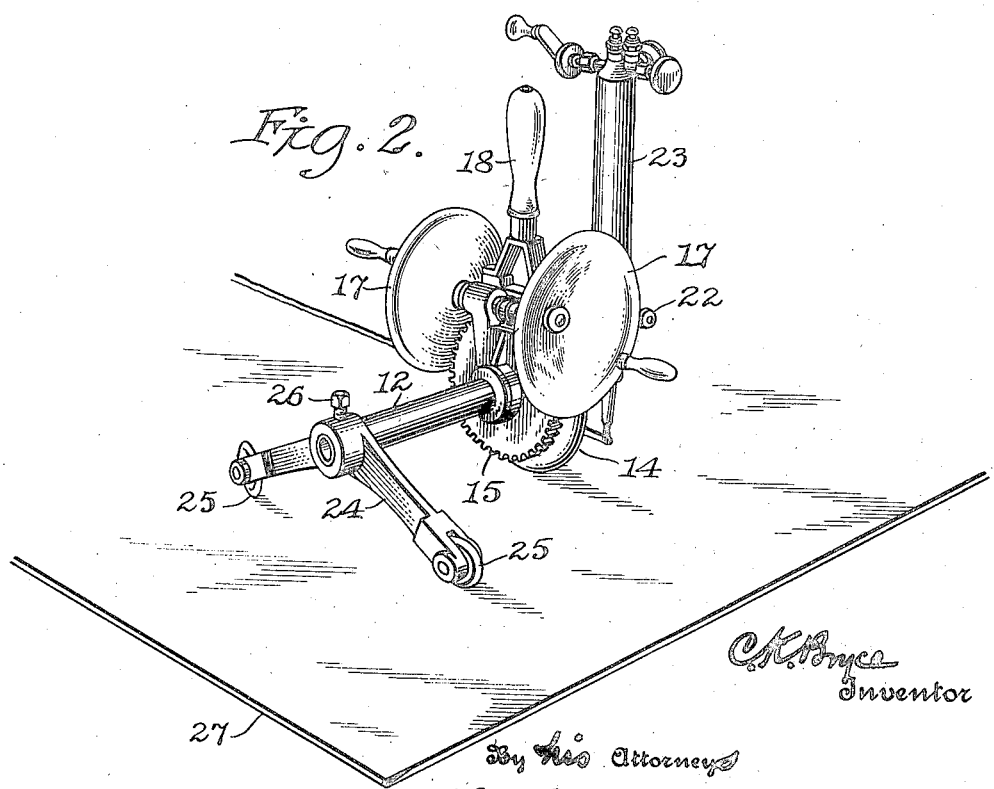
Fig. 2 is a similar view showing the apparatus making a straight-line cut.

When the apparatus is used to make a straight cut the yoke is arranged as in Fig. 2, its two rollers and the tractor wheel then constituting a rolling tripod, so to speak. Grasping the handle 18 with one hand the operator rotates either crank disk with the other, thereby rotating the tractor-wheel and causing the whole device to travel on the plate, which is indicated at 27. The knife-edge rollers take sufficient bite or grip in the plate to cause them to travel in a direction at right angles to the sleeve 12, thereby causing the apparatus to carry the blowpipe over the plate in a straight line.

For cutting an arc, one arm of the yoke 24 is turned up as shown in Fig. 1 and the sleeve 12 is fitted on the end of a radius-bar or beam 28, Fig. 1, having an adjustable center-point 29. The latter is seated in the surface of the plate, with the result that when the apparatus is driven by the tractor wheel it will carry the blow pipe in the arc of a circle around the point 28 as a center.

It is to be understood that the invention is not limited to the construction herein specifically illustrated and described but may be embodied in other forms without departure from its spirit.

I claim:

1. In a plate-cutting apparatus, in combination, a blowpipe, a tractor wheel to move the same over the plate, means for actuating the tractor wheel, and supporting and guiding means for engaging the surface of the plate, said supporting and guiding means comprising a pair of spaced rollers and carrying means therefor revolubly adjustable to permit one or both rollers to engage the plate.

2. In a plate-cutting apparatus, in combination, a blowpipe, a tractor wheel to move the same over the plate, means for actuating the tractor wheel; and supporting and guiding means comprising a pair of forwardly and rearwardly disposed arms pivotally mounted at their inner ends to be revolubly adjusted on a transverse axis, and rollers journaled in the arms to engage the plate.

3. In a plate-cutting apparatus, in combination, a blowpipe, a tractor wheel to move the same over the surface of the plate, means for actuating the tractor wheel, a supporting member arranged transversely of the path of the tractor wheel and adapted for connection with a radius-rod, and supporting and guiding means carried by said support and revolubly adjustable thereon to permit movement of the apparatus in a straight or curved path as desired.

4. In a plate-cutting apparatus, in combination, a blowpipe, a tractor wheel to move the same over the plate, means for actuating the tractor wheel, a transverse sleeve connected at one end to the said actuating means and at its other end adapted to receive a radius-rod, a pair of angularly disposed arms revolubly adjustable on said sleeve, and a pair of supporting and guiding rollers carried by the arms to bear on the surface of the plate.

In testimony whereof I hereunto affix my signature.

CHALMERS K. BRYCE.